April 14, 1953      N. CRIPPEN      2,634,637
CAM ACTUATED JAR CLAMP
Filed June 25, 1951
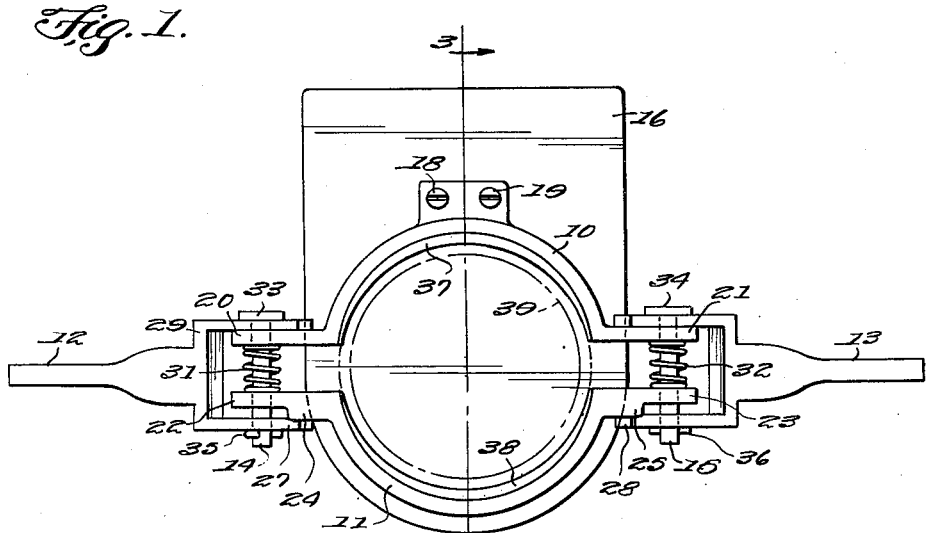
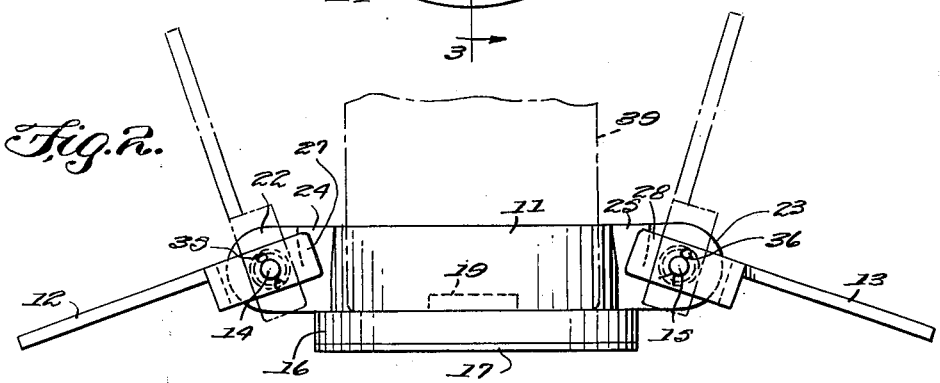
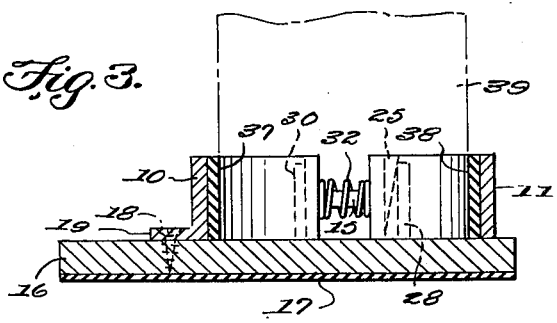
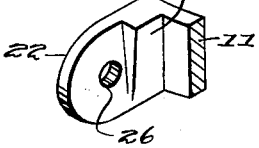
INVENTOR.
Nellie Crippen,
BY *Victor J. Evans & Co.*
ATTORNEYS Patented Apr. 14, 1953

2,634,637

UNITED STATES PATENT OFFICE 2,634,637

CAM ACTUATED JAR CLAMP

Nellie Crippen, Portland, Oreg.

Application June 25, 1951, Serial No. 233,412

3 Claims. (Cl. 81—3.32)

This invention relates to clamps and other types of gripping devices for holding containers such as fruit jars as caps are tightened on and removed from jars, and in particular this invention relates to a clamp including two substantially semi-circular sections with one of the sections having tabs by which it is secured to a table, shelf, or the like and with handles pivotally mounted in flanges extended from the ends of the sections and having extended ends positioned to coact with cams on the flanges of one section whereby the sections are forced together to positively grip the can or container between the sections as the handles are moved downwardly.

The purpose of this invention is to provide means for positively gripping a fruit jar or container whereby the pressure is applied equally at all points around the surface of the container.

Various devices have been provided for holding fruit jars and other similar containers as caps are tightened on and removed from the jars, however, where glass jars are used there is danger of breaking the jar and damaging the hands or wrists of a person tightening a cap on the jar unless the gripping action is applied continuously at all points around the surface of the jar. With this thought in mind this invention contemplates a jar clamp or holder wherein the gripping action is obtained with cam acting handles positioned on both sides of a jar whereby with both handles coacting with cams the gripping pressure is equally distributed throughout the peripheral surface of the jar.

The object of this invention is, therefore, to provide means for forming a device for holding fruit jars wherein the gripping action is applied continuously around a jar clamped therein.

Another object of the invention is to provide a clamp for positively gripping fruit jars that may be used for both round and square jars.

A further object of the invention is to provide a positive action clamp for holding fruit jars and other containers which is of a simple and economical construction.

With these and other objects and advantages in view the invention embodies a substantially semi-circular section having a tab extended at one end by which the holder is attached to a table top or the like and having flanges extended from the ends, a complementary semi-circular section having flanges with cams on the surfaces positioned to coact with the former section, and having handles with yokes on the ends pivotally mounted in the flanges of the said semi-circular sections and positioned to coact with the cam surfaces of the said complementary section for forcing the sections into gripping relation with a container positioned in the holder.

Other features and advantages of the invention will appear from the following description taken in connection with the drawings wherein:

Figure 1 is a plan view showing the improved vise grip fruit jar holder.

Figure 2 is a side elevational view of the holder with the parts in the gripping position as illustrated in Figure 1.

Figure 3 is a cross section through the holder taken on line 3—3 of Figure 1.

Figure 4 is a detail illustrating one of the cams on the flanges of one of the sections of the holder.

Referring now to the drawings wherein like reference characters denote corresponding parts the improved container holder of this invention includes a stationary semi-circular section 10, a complementary movable section 11, handles 12 and 13 pivotally mounted on flanges extended from the ends of the semi-circular sections by pins 14 and 15, and a base 16 having a friction pad 17 on the lower surface and on which the section 10 is mounted by screws 18 which extend through a tab 19.

As shown in the drawings, the section 10 is provided with extended flanges 20 and 21 and coacting flanges 22 and 23 on the ends of the section 11 are provided with cam surfaces 24 and 25.

The pins 14 and 15 extend through openings, as indicated by the numeral 26, in the flanges and with the ends 27 and 28 of the arms of yokes 29 and 30 on the ends of handles 12 and 13, respectively positioned to coact with the cam surfaces 24 and 25, the section 11 is urged toward the section 10 as the handles 12 and 13 are moved downwardly from positions indicated by dash and dot lines in Figure 2 to positions indicated with full lines.

Springs 31 and 32 positioned between the flanges and around the pins 14 and 15, respectively, urge the sections 10 and 11 apart when the handles are moved upwardly, releasing the ends 27 and 28 from the high points of the cams.

The pins 14 and 15 are provided with heads 33 and 34, respectively, and cotter pins 35 and 36 extend through the opposite ends.

As illustrated in Figure 3 the sections 10 and 11 are lined with rubber, or other resilient material, as indicated by the strips 37 and 38 and strips of different thicknesses may be provided to compensate for jars or containers of different sizes or a plurality of strips may be used as may be desired.

With the parts arranged in this manner a jar, as indicated by the dot and dash lines 39 is placed between the sections with the handles extended upwardly and as the handles are drawn downwardly the resilient strips positively grip the peripheral surface of the jar or container at all points throughout the periphery thereof.

It will be understood that the resilient elements or strips 37 and 38 may be provided with tapered ends, as shown in Figure 1 or the strips may be of any suitable design.

It will be understood that modifications may be made in the design and arrangement of the parts without departing from the spirit of the invention.

What is claimed is:

1. A jar holder comprising semi-circular sections having flanges extended from the ends, the flanges of one of said sections having cam surfaces on the outer surfaces thereof, handles having yokes straddling the flanges, said handles being pivotally mounted on the said flanges and positioned to coact with the said cam surfaces of the flanges for urging the sections of the holder together upon movement of the handles.

2. In a jar holder, the combination which comprises a stationary semi-circular section having flanges extended at the ends and having a tab extended from one side for mounting the section upon a supporting surface, a complementary semi-circular section also having flanges extending from the ends and having cam surfaces on the said flanges, bolts extending through flanges of the sections, and handles with yokes on the ends thereof pivotally mounted on the said bolts and positioned whereby parts thereof coact with the cam surfaces of the flanges of the complementary section for urging the said complementary section toward the stationary section of the holder upon movement of the handles.

3. In a jar holder, the combination which comprises a stationary semi-circular section having flanges extended at the ends and having a tab extended from one side for mounting the section upon a supporting surface, a complementary semi-circular section also having flanges extending from the ends and having cam surfaces on the said flanges, bolts extending through flanges of the sections, handles with yokes on the ends thereof pivotally mounted on the said bolts and positioned whereby parts thereof coact with the cam surfaces of the flanges of the complementary section for urging the said complementary section toward the stationary section of the holder upon movement of the handles, springs on the bolts positioned between the flanges for urging the sections of the holder apart and resilient lining strips on the inner surfaces of the said stationary and complementary sections of the holder.

NELLIE CRIPPEN.

References Cited in the file of this patent

UNITED STATES PATENTS

| Number | Name | Date |
|--------|------|------|
| 936,927 | McCallum | Oct. 12, 1909 |
| 1,858,144 | Fariello | May 10, 1932 |